(No Model.)

R. WRUBLIK.
CROSSCUT SAW.

No. 605,368. Patented June 7, 1898.

Witnesses:
E. Jacker.
J. S. Noble.

Inventor.
Rudolf Wrublik
by B. Singer
Att'y.

UNITED STATES PATENT OFFICE.

RUDOLF WRUBLIK, OF CHICAGO, ILLINOIS.

CROSSCUT-SAW.

SPECIFICATION forming part of Letters Patent No. 605,368, dated June 7, 1898.

Application filed August 5, 1897. Serial No. 647,258. (No model.)

*To all whom it may concern:*

Be it known that I, RUDOLF WRUBLIK, a citizen of the United States, residing at Chicago, county of Cook, and State of Illinois, have invented a new and useful Improvement in Crosscut-Saws, of which the following is a specification.

The objects of my invention are to provide a crosscut-saw for felling trees or cutting sawlogs by means of a crescent-bladed saw attached to a long handle, providing a leverage for its operation, providing a labor-saving device, and preventing the waste incident to the use of the axe. I accomplish these objects by means of the mechanism illustrated in the accompanying drawings, in which—

Figure 1:
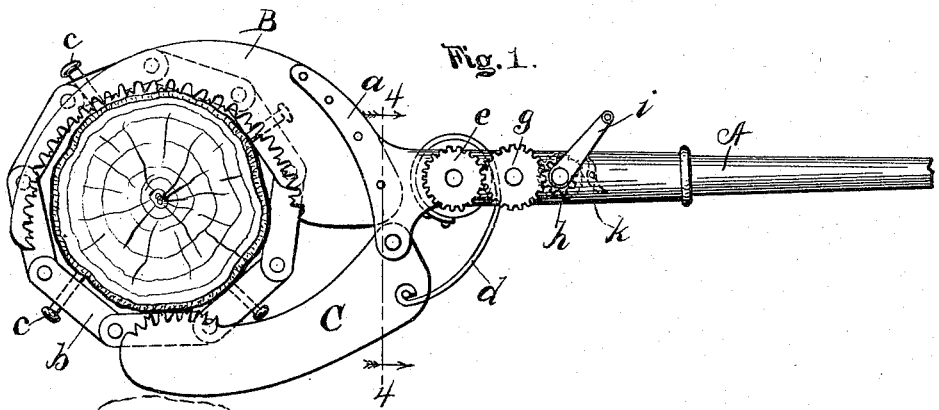
Figure 2:
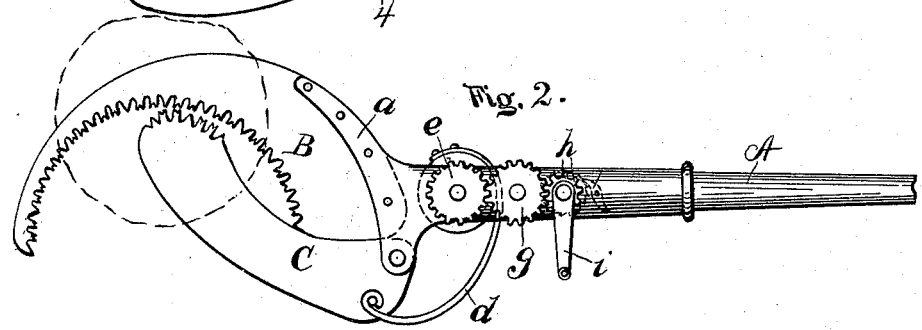
Figure 3:
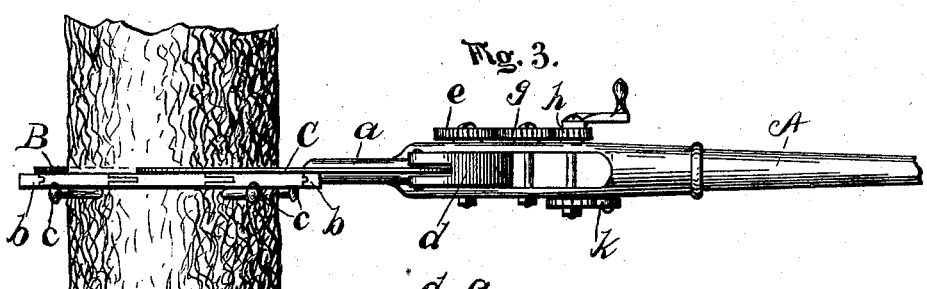
Figure 4:
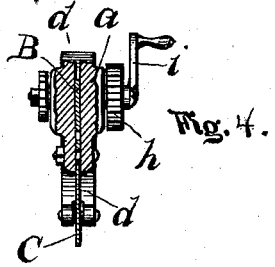

Figure 1 is a plan view of the device in position for felling a tree. Fig. 2 is a plan view when closed. Fig. 3 is a side view of Fig. 1. Fig. 4 is a section on line 4 4, Fig. 1.

Similar letters refer to similar parts throughout the several views.

Attached to a long handle A are two saw-blades B and C. The crescent-shaped blade B, having teeth on its concaved edge, is firmly secured to the handle A by means of a reinforcing-plate a, forming a rigid or integral extension of said handle. Opposite the crescent blade B is the second blade C, pivotally attached to the handle by means of a bolt. This blade is a short broad segment in form, with blunt ends, but having teeth only at its free end. These two blades are adapted to partially surround the tree or timber to be cut and are operated by a proper movement of the handle—for instance, by carrying it around the tree or by reciprocating it back and forth.

To support the blades upon the tree-trunk or to register their position on the timber to be cut, a flat linked chain b may be passed around and fastened to the trunk and held in position by spikes or pins c, although the pins are not always necessary.

The saw-blades are held in engagement with the tree for effective operating by means of the spring d, attached to the hub of the gear-wheel e on the handle A and pressing against the pivoted blade C. This spring d is set and released by means of an idle-wheel g and pinion h, to the shaft of which latter is attached a crank i, so that by turning the crank the pressure of the spring may be increased or renewed as the cut narrows, and by releasing it the tension may be taken off. A pawl k, pivoted to the handle A, engages with a ratchet-wheel upon the pinion-shaft to hold the spring at any given adjustment. The blade C, being pivotally attached to the handle and acted upon by the spring d, will be braced or pressed toward the opposite blade with a stress determined by the adjustment of the spring, keeping both blades in engagement with the timber and holding them up to their work, so that the manipulating of the handle causes them to saw the trunk through. When not in use, the blades may close together, as in Fig. 2, occupying but little space.

Having thus described my invention, what I claim as new, and desire to secure by Letters Patent, is—

1. In a crosscut-saw, the combination of a saw-blade rigidly attached to a handle, an opposing saw-blade pivotally attached to said handle, and a spring pressing upon said pivoted blade.

2. In a crosscut-saw, the combination of a crescentic saw-blade attached to a handle, an opposing segmental saw-blade pivotally attached to said handle, and a spring pressing upon said pivoted blade.

3. In a crosscut-saw, the combination of a crescentic saw-blade attached to a handle, an opposing segmental saw-blade pivotally attached to said handle, a spring pressing upon the pivoted blade, and means for determining the tension of said spring.

4. In a crosscut-saw, the combination of a crescentic saw-blade attached to a handle, an opposing segmental saw-blade pivoted to said handle, a spring pressing upon said pivoted blade, a gear-wheel to the hub of which the heel end of said spring is attached, an idle-wheel engaging with said gear-wheel, a crank-handle for turning the pinion, a ratchet-wheel on the pinion-shaft and a pawl upon the handle, which engages with the ratchet-wheel.

5. In a crosscut-saw, the combination of a handle carrying ratchet and gear wheels, a spring controlled by said wheels, crescentic and segmental blades adapted to encircle a tree, and one of which is pivoted and pressed upon by said spring and a flat chain rest or support, as and for the purpose described.

In testimony whereof I affix my signature in presence of two witnesses.

RUDOLF WRUBLIK.

Witnesses:
L. HANKE,
J. BUEHLER.